United States Patent
Leijten et al.

(10) Patent No.: US 7,082,518 B2
(45) Date of Patent: Jul. 25, 2006

(54) INTERRUPTIBLE DIGITAL SIGNAL PROCESSOR HAVING TWO INSTRUCTION SETS

(75) Inventors: Jeroen Anton Johan Leijten, Eindhoven (NL); Marco Jan Gerrit Bekooij, Eindhoven (NL); Adrianus Josephus Bink, Eindhoven (NL); Johan Sebastiaan Henri Van Gageldonk, Eindhoven (NL); Jan Hoogerbrugge, Eindhoven (NL); Bart Mesman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 539 days.

(21) Appl. No.: 09/981,135

(22) Filed: Oct. 16, 2001

(65) Prior Publication Data

US 2002/0083253 A1    Jun. 27, 2002

(51) Int. Cl.
*G06F 15/76* (2006.01)
(52) U.S. Cl. .................. 712/228; 712/229; 712/233; 712/35; 712/43
(58) Field of Classification Search .............. 712/35, 712/43, 228, 229, 233
See application file for complete search history.

(56) References Cited

U.S. PATENT DOCUMENTS

| 5,003,462 | A |   | 3/1991  | Blaner et al. ............ 364/200 |
|-----------|---|---|---------|-----------------------------------|
| 5,115,506 | A |   | 5/1992  | Cohen et al. ............ 395/725  |
| 5,717,933 | A |   | 2/1998  | Mann .................... 395/735  |
| 5,844,422 | A | * | 12/1998 | Trimberger et al. ...... 326/38    |
| 5,860,014 | A |   | 1/1999  | Cheong et al. .......... 395/733   |
| 5,987,601 | A |   | 11/1999 | Donovan ................ 712/244   |
| 6,026,479 | A |   | 2/2000  | Fisher et al. ........... 712/24   |
| 6,128,728 | A | * | 10/2000 | Dowling ................ 712/228   |

* cited by examiner

*Primary Examiner*—Henry W. H. Tsai
*Assistant Examiner*—Tonia L. Meonske

(57) ABSTRACT

The present invention relates to a digital signal processing apparatus comprising a plurality of available hardware resource means and a first instruction set means having access to said available hardware resource means, so that at least a part of said hardware resource means execute operations under control of said first instruction set means, and further comprising a second instruction set means having access to only a predetermined limited subset of said plurality of available hardware resource means, so that at least a part of said predetermined limited subset of said hardware resource means execute operations under control of said second instruction set means. Further, the present invention relates to a method for processing digital signals in a digital signal processing apparatus comprising a plurality of available hardware resource means, wherein at least a part of said hardware resource means execute operations under control of a first instruction set, and wherein at least a part of a predetermined limited subset of said plurality of available hardware resource means execute operations under control of a second instruction set having access to only said predetermined limited subset of said hardware resource means.

11 Claims, 2 Drawing Sheets

INTERRUPTIBLE DIGITAL SIGNAL PROCESSOR HAVING TWO INSTRUCTION SETS

The present invention relates to a digital signal processing apparatus comprising a plurality of available hardware resource means and a first instruction set means having access to said available hardware resource means, so that at least a part of said hardware resource means execute operations under control of said first instruction set means, as well as to a method for processing digital signals in such a digital signal processing apparatus.

To be able to quickly respond to external events, digital signal processors (DSP) use interrupts. For real-time performance required in digital signal processors a short, predictable interrupt latency is of key importance. In order to achieve this, ideally a processor should be always interruptable. Interrupts are external events which can temporarily interrupt the execution of a programm to perform a higher priority task implemented as an interrupt service routine (ISR) before continuing with the original programm.

An interrupt causes the processor to temporarily postpone the further execution of the current programm trace and instead perform another trace. The state of the postponed trays must be saved such that, when the interrupt has been serviced, the processor can restore its original state and can correctly proceed with the original trace. The amount of state which must be saved and, accordingly, the number of processor cycles required to save the state is dependent of the point in the program where the processor is interrupted.

To limit the impact of context saving, in many commercially available digital signal processors constraints are imposed on the interruptibility of the processor.

In the "TriMedia" processor which is a VLIW (Very Large Instruction Word) media processor developed by Philips, in order to minimize the amount of state that needs to be saved on an interrupt, such processor only services interrupts at specific points in the programm flow. These points only occur between decision trees, where only global variables are alive. The architecture knows of these points through so-called interruptable jumps. Unfortunately, the compilation process hampers good interrupt latency, since to obtain good parallel code it will try to make basic blocks as large as possible, for example through if-conversion, grafting and speculation. To obtain a good interrupt latency, interruptible jumps should occur often, which conflicts with the compiler goals. As a result, in the "TriMedia" processor interrupt latency is highly code-dependent, unpredictable, and usually long unless the compiler is explicitly forced to include interruptible jumps at regular points in the code.

Texas Instruments' "VelociTI" architecture does not allow interrupts during branches or in the shadow of a branch. Unfortunately, this architecture has a relatively long branch delay of 5 cycles. Furthermore, it allows branches to be scheduled in branch delay slots, thereby effectively stretching the total branch shadow. Since in most algorithms a lot of branching takes place, an interrupt can rarely occur.

The first generation "R.E.A.L." core processor can always be interrupted, except when a single instruction loop using a "repeat" instruction is being excecuted. To ensure a sufficiently short interrupt latency, the number of loop iterations must therefore be kept sufficiently small by splitting a high-iteration loop in multiple small-iteration loops, if necessary. Because of the non-interruptibility of the repeat instruction, such instruction will no longer be supported in the second generation "R.E.A.L." core processors.

U.S. Pat. No. 5,987,601 A describes a unique hardware zero overhead interrupt and task change system for the reduction or elimination of interrupt latency and task change processing overhead delays in computer architectures. Without loss of time, this conventional system performs complete task state saving and restoration between one cycle and the next without software intervention. For each central processing unit register, this system uses one or more auxiliary latches wherein one latch is used as the "running" latch and one of the auxiliary latches is attached to a task storage memory. The system swaps connections between alternate "running" registers and auxiliary register while transferring other tasks to and from the task storage memory. Further, this system provides a task linking system to allow the linking of tasks or the mandatory sequentially execution of the linked tasks. Finally, this system includes a priority "impatience" counter system to increase the relative priorities of various tasks as they approach their task deadlines.

U.S. Pat. No. 5,860,014 A discloses a method and apparatus for maintaining content of registers of a processor which uses the registers for processing instructions. Entries are stored in a buffer for restoring register content in response to an interruption by an interruptible instruction. Entries include information for reducing the number of entries selected for the restoring. A set of the buffer entries is selected, in response to the interruption and the information, for restoring register content. The set includes only entries which are necessary for restoring the content in response to the interruption so that the content of the processor registers may be restored in a single processor cycle, even if multiple entries are stored for a first one of the registers and multiple entries are stored for a second one of the registers.

From U.S. Pat. No. 5,115,506 A it is further known a microprocessor including unprime registers for use during normal operation, prime registers for use during interrupts, a normal register set for use during interrupts, a normal register set for use during normal operation and conventional interrupt operations, an alternate register set for use during fast interrupt operations, and a memory stack. Three status bits are used to indicate that one or more fast interrupts have been initiated but not completed, that a fast interrupt is occurring but there are no other fast interrupts being processed, and that the CPU is currently processing a fast interrupt. These status bits indicate if there is a recursion jeopardy and are used to control the flow of information between the normal and alternate register sets and the memory stack in order to prevent recursion.

In U.S. Pat. No. 5,003,462 A an apparatus and method are disclosed for implementing the system architectural requirement of precise interrupt reporting in a pipelined processor with multiple functional units. Since the expense of an interrupt pipeline is warranted only for those interrupts that occur frequently—specifically, those arising from virtual memory management—the apparatus utilizes an interrupt pipeline for frequently occurring interrupts, and a slower, but much less costly, software-based system for precisely reporting the remaining interrupts. The software-based system is facilitated by an instruction numbering and tracing scheme, whereby pertinent information concerning executed instructions is recorded as the instructions pass through the processor pipeline and potentially to other functional units. A software interrupt handler may use this information to isolate and precisely report an interrupt.

In order to be able to obtain a predictable and short interrupt latency, it must always be possible to interrupt the processor whenever desired. Interrupting a processor at an arbitrary point in the program can imply that a significant amount of state must be saved. Only a part of the state is available as variables in register files and readily available to the programmer for saving or restoring via normal load/store operations. The remainder of the state is under normal operation invisible to the programmer, hidden in e.g. functional unit pipeline stages. Special measures in the hardware are required to provide access to this state for saving and restoring.

To obtain an efficient code, a powerful VLIW compiler schedules operations based on so-called "Non-Unit-Assumed-Latency with Equal" (NUAL-EQ) semantics. This results in the provision of schedules which cannot be cut at arbitrary positions by interrupts without taking special precautions in the hardware to prevent incorrect processor behavior. The most straightforward way to deal with the problem of cutting a schedule is the use of a shadow buffer to save the state. Implementing a shadow buffer means that all state registers in a processor are duplicated. The shadow buffer is used to take a copy of the processor state at the interrupt handling and keeps this copy until either the interrupt handling is finished and the saved copy is restored in state registers or the interrupt is again interrupted by a higher-priority interrupt. In the latter case, the shadow buffer contents are saved to a software stack in a data memory, and a new copy of the processor state is taken. However, this is an expensive solution.

An object of the present invention is to provide a solution which requires less hardware overhead.

In order to achieve this object and other objects, according to a first aspect of the present invention there is provided a digital signal processing apparatus comprising a plurality of available hardware resource means and a first instruction set means having access to said available hardware resource means, so that at least a part of said hardware resource means execute operations under control of said first instruction set means, characterized by a second instruction set means having access to only a predetermined limited subset of said plurality of available hardware resource means, so that at least a part of said predetermined limited subset of said hardware resource means execute operations under control of said second instruction set means.

According to a second aspect of the present invention there is provided a method for processing digital signals in a digital signal processing apparatus comprising a plurality of available hardware resource means wherein at least a part of said hardware resource means execute operations under control of a first instruction set, characterized in that at least a part of a predetermined limited subset of said plurality of available hardware resource means execute operations under control of a second instruction set having access to only said predetermined limited subset of said hardware resource means.

According to the present invention, the digital signal processing apparatus supports both a first instruction set which has access to all available hardware resources and is therefore a normal instruction set as well as a second instruction set which has access to only a limited subset of hardware resources and therefore can also be called compact instruction set. So, in accordance with the present invention, there is provided a digital signal processing apparatus with a dual instruction set, wherein one of the instruction sets, namely the compact second instruction set, only requires a small subset of all hardware resources. The advantage of the use of a compact second instruction set is to save code size in program portions which have no strict performance requirements. Since the compact second instruction set has a limited view on hardware resources, instructions in such instruction set can be encoded with much less bits than instructions in the normal first instruction set. Hence, performance can be traded off for code size. The normal first instruction set is used for program portions which require high performance (e.g. time critical loops in DSP code), so that usually the normal first instruction set includes wide VLIW instructions consisting of a lot of program bits.

A further advantage of the concept of the present invention is to reduce the amount of state which must be saved upon an interrupt. When the normal first instruction set would be used in an interrupt service routine (ISR), the state of all hardware resources used by this instruction set, i.e. the state of the whole processing apparatus, must be saved. If in 'light-weight' interrupt service routines only the compact second instruction set is used, it is sufficient to save the state of only the limited subset of the hardware resources used by the compact second instruction set, while simply freezing the state in all other resources. This can save a lot of time during context switches. So, the compact view of the hardware resources can also be used to reduce the overhead of context switching in case of an interrupt. Since many interrupts require very simple handlers, i.e. interrupt service routines, usually it suffices that these handlers use only the compact second instruction set according to the present invention.

After all, the solution of the present invention requires small hardware overhead only.

Usually, said available hardware resource means are processor resource means.

A preferred embodiment of the present invention comprises first state buffer means for storing the current state of hardware resource means in case of an interrupt, wherein in case of an interrupt said first state buffer means stores the current state of at least a part of such hardware resource means which are not included in said predetermined limited subset of said hardware resource means. Such first state buffer means can e.g. be provided as a separate buffer hardware device or define a logical buffer in the data memory included in the digital signal processing apparatus.

Further, second state buffer means can be provided for storing in case of an interrupt the current state of at least a part of said predetermined limited subset of said hardware resource means, said second state buffer means having a smaller size than that of said first state buffer means. This second state buffer means can e.g. be provided as a separate buffer hardware device or define a further logical buffer portion in the data memory of the digital signal processing apparatus. So, the second state buffer means according to the preferred embodiment of the present invention can be considered a small shadow buffer means. Since the compact second instruction set has a limited view on the hardware resource means, a considerable reduction of costs is achieved by limiting the required size of the shadow buffer in contrast to the full-size shadow buffer of the prior art. In other words, for demanding interrupts, the compact second instruction set can be used to reduce the hardware overhead of implementing a full shadow buffer for all hardware resource means.

Usually, means for supplying power to the second state buffer means is provided, wherein in a preferred embodiment of the present invention said power supply means essentially supplies power to said second state buffer means only during interrupt handling so that the second state buffer means keeps its state during that time. Usually, "power" means both supply voltage and clock. Under normal operation when no interrupt occurs, the power for the second state buffer means can be completely shut off to save power. During the full period of interrupt handling the supply voltage should be applied such that the second state buffer means keeps its state. The clock needs only to be applied to the second state buffer means at the beginning of the interrupt service routine when a copy of the state is made and stored in the second state buffer means, whereas during the remainder of the interrupt handling no clock needs to be applied if the second state buffer means is made of flipflops, and in this case at the end of the interrupt service routine the contents of the second state buffer means can be read without requiring a clock.

Moreover, at least a part of such hardware resource means which are not directly accessible and not included in said predetermined limited subset of said hardware resource means are chained together in a first scan chain means, and at least a part of such hardware resource means which are not directly accessible and included in said predetermined limited subset of said hardware resource means are chained together in a second scan chain means. The advantage of this measure is to reduce the number of required bits for addressing the second state buffer means. In particular, the flipflops belonging to such hardware resource means which are not included in the limited subset of the hardware resource means and the shadow register of such hardware resource means which are included in the limited subset of the hardware resource means can be chained together in scan chains. Scan chains are constructed by connecting all flipflops holding state informations in a piece of hardware into a chain. In that case, only the beginning or end of the chain needs to be addressed for saving and restoring. Reading or writing of a scan chain should result in shifting out or shifting in the chain contents. These scan chains may be combined with the scan chains already required for IC testing purposes wherein the scan chains of the latter kind are not part of the normal functionality of the corresponding hardware elements, but used during the testing of the proper functioning of such hardware elements where it is allowed to read out or write in the state such that at any given moment in time the internal state of the corresponding hardware element can be verified against the expected behaviour. To allow saving only a part of the state, groups of scan chains could be made, wherein each group of the scan chains can be addressed separately in the second state buffer means register file.

In accordance with a further preferred embodiment of the present invention, said second instruction set means does not allow operations in parallel. By not allowing the compact second instruction set to execute operations in parallel, a reduction of the use of the hardware resource means is achieved. Namely, the normal first instruction set is usually a VLIW instruction set, meaning that instructions are composed of several operations which can execute simultaneously. Executing operations simultaneously requires multiple hardware resources to be used in parallel. As already mentioned above, the compact second instruction set has a limited view on the hardware resources so that any limited view which is not the full parallel view would qualify for use by the compact second instruction set.

The present invention is preferably used in the "COCOON" ambedded DSP core architecture template. From this architecture template the third generation "R.E.A.L." core family is derived. These cores are aimed at demanding audio applications (e.g. compressed audio) and third generation mobile telecom applications (UMTS). The application of the invention is also useful in any type of programmable processor where short and predictable interrupt latency is important and the saving of internal state is likely to become a 'bottleneck'.

The above and other objects and features of the present invention will become clear from the following description taken in conjunction with the preferred embodiments with reference to the accompanying drawings in which.

Figure 1:
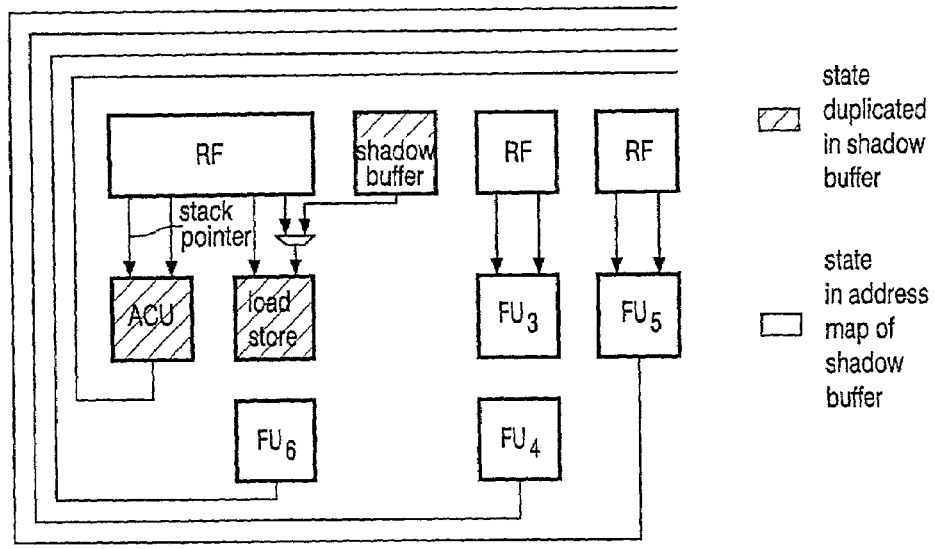
FIG. 1 is a schematic block diagram of a portion of a VLIW datapath.

FIG. 1 shows a schematic block diagram of a portion of a VLIW datapath in which shadow flipflops and flipflop scan chaines are combined in a single address map through a shadow buffer register file, where "RF" means register file, "FU" means functional unit and "ACU" means address computation unit for computing memory addresses. The arrangement shown in FIG. 1 is implemented in a processor with a dual instruction set, wherein one of the instruction sets called the compact instruction set (CIS) only requires a (small) subset of all processor resources. The other one of the instruction sets is the normal instruction set consisting of a VLIW instruction set, which means that instructions are composed of several operations which can execute simultaneously. The simultaneous execution of operations requires multiple hardware resources to be used in parallel. In contrast thereto, the compact instruction set has a limited view on the processor hardware and is not allowed to execute operations in parallel. So, any limited view which is not the full parallel view would qualify for use by the compact instruction set.

The resources which belong to the compact set (CIS) and are also called CIS resources have all their state duplicated as shadow registers in a (small) shadow buffer. These resources naturally include the state of the sequencer. Upon an interrupt a copy of all the CIS state is stored in the shadow buffer. This takes only a single clock cycle. Simultaneously, all resources that are not used by the compact instruction set and are called non-CIS resources have their state frozen, for example by means of clock gating. Saving the processor state upon an interrupt can be done by taking a 'snapshot' of the state just before the interrupt will be serviced. Such snapshot should be saved during the execution of the interrupt service routine and restored when the interrupt service routine finishes, such that the processor can continue in the exact same state and at the exact program location where it left off when it was interrupted. After such a snapshot is taken and all remaining state is frozen, the execution of the interrupt service routine can start. Therefore, the interrupt latency is only 1 cycle.

Instructions in the first part of this interrupt service routine must originate in the compact instruction set. As long as the state of the non-CIS resources is being saved or restored, only the compact instruction set may be used and all other hardware resources are frozen. After saving the CIS state, the remaining state can be saved by directly reading out the flipflops which are contained in the functional units FU. For this purpose, such flipflops are grouped in memory words and placed in an adjustable register file map e.g. within the register file map of the shadow buffer (cf. FIG. 1).

To reduce the number of required bits for addressing the shadow buffer, the flipflops belonging to non-CIS resources and shadow registers of the CIS resources can also be chained together in scan chains. In that case only the beginning or end of the chain needs to be adressed for saving and restoring. Reading or writing of a scan chain should result in shifting out or shifting in the chain contents. These scan-chains may be combined with the scan chains already required for IC-testing purposes. To allow saving of only a part of the state, groups of scan chains could be made, where each group of scan chains can be addressed separately in the shadow buffer register file.

Before re-enabling the non-CIS resources, all the state of non-CIS functional units is invalidated, so that no invalid data is written to any register file or load/store operations are performed when non-CIS functional units are reactivated. From that moment on, the full instruction set may be used again and all required normal variable registers can be saved using load/store operations on normal register files. After the state of required registers is saved, all interrupts may be re-enabled to allow interrupt nesting. Interrupt nesting refers to a situation where an interrupt is allowed to interrupt the interrupt service routine of another interrupt.

Figures 2A, 2B:
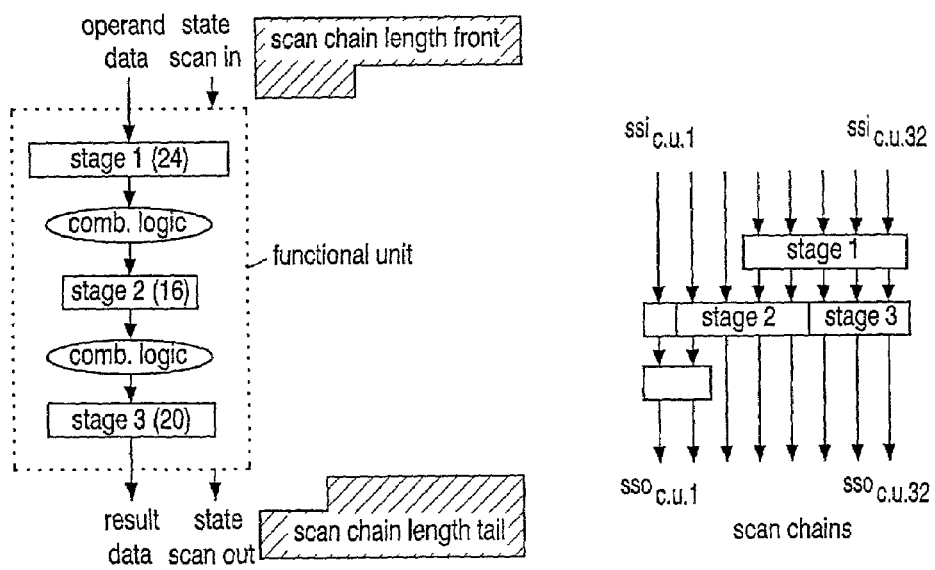
FIG. 2a is a schematic block diagram showing a functional unit with three pipeline stages.
FIG. 2b shows the corresponding state scan organisation of pipeline registers.

M scan chains run through non-CIS resources and through the shadow registers of the CIS resources, with the exception of registers that are directly accessible via software. Here M is equal to the number of bits that can be written in parallel to data memory. This number is equal to the data memory word width times the number of load/store units that can be used in parallel to save and restore state. The scan chains are used to scan the current state in and out of the resources upon start and end of an interrupt service routine. With the exception of the registers that are directly accessible via software, all resources are chained together via these M scan chains. Internally in resources, such as functional units, the flipflops are arranged in scan chains in such a way that balanced chains are obtained. For example, in a typical functional unit the chain should run through a number of flipflops such that the total length of the chain is at most one flipflop more or less than the total length of all other chains. This means that, with a total of N flipflops in the functional unit, to every scan chain [N/M] flipflops should be added. The remaining N−M·[N/M] flipflops should be added first to the chains that upon entering the functional unit have passed the smallest number of flipflops. An example is given in FIG. 2, wherein FIG. 2(a) shows a functional unit with three pipeline stages of 24, 16 and 20 bits, and FIG. 2(b) shows the corresponding state scan organization of pipeline registers into 32 scan chains.

Figures 3A, 3B:
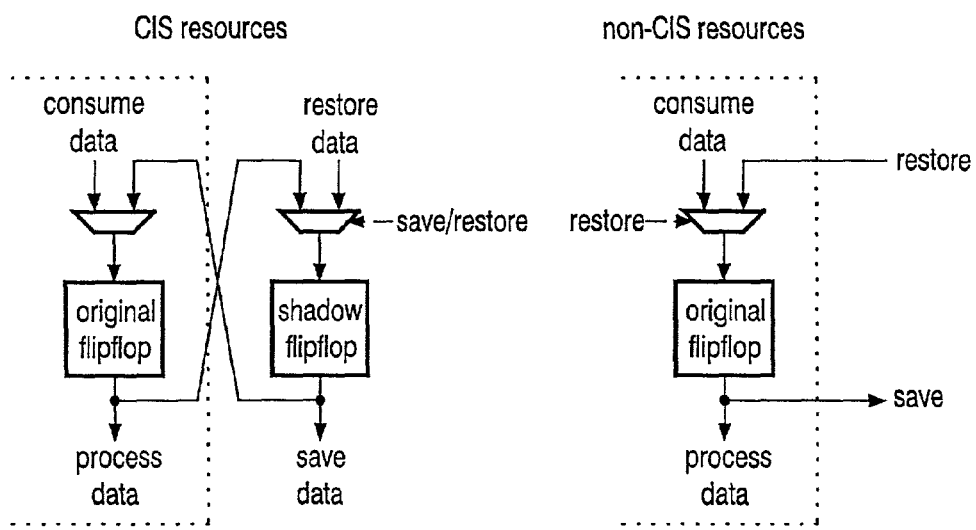
FIG. 3 shows a schematic block diagram of flipflop arrangements for compact instruction set (CIS) resources (a) and for non-CIS resources (b)

FIG. 3 shows shadow flipflops for CIS resources (a) and flipflop scanning for non-CIS resources (b). However, this illustration does not show clock gating used to freeze state and at the same time save power.

Under normal operation when no interrupt occurs, the power for the shadow buffer can be completely shut off so that there is both no supply voltage and no clock. Only during the full period of interrupt handling the supply voltage is applied such that the shadow buffer is active and keeps its state. The clock is only applied to the shadow buffer at the beginning of the interrupt service routine when a copy of the state is made and stored in the shadow buffer. During the remainder of the interrupt handling no clock needs to be applied in case the shadow buffer is made of flipflops, and in such case at the end of the interrupt service routine the contents of the shadow buffer can be read without requiring a (further) clock.

Figure 4:
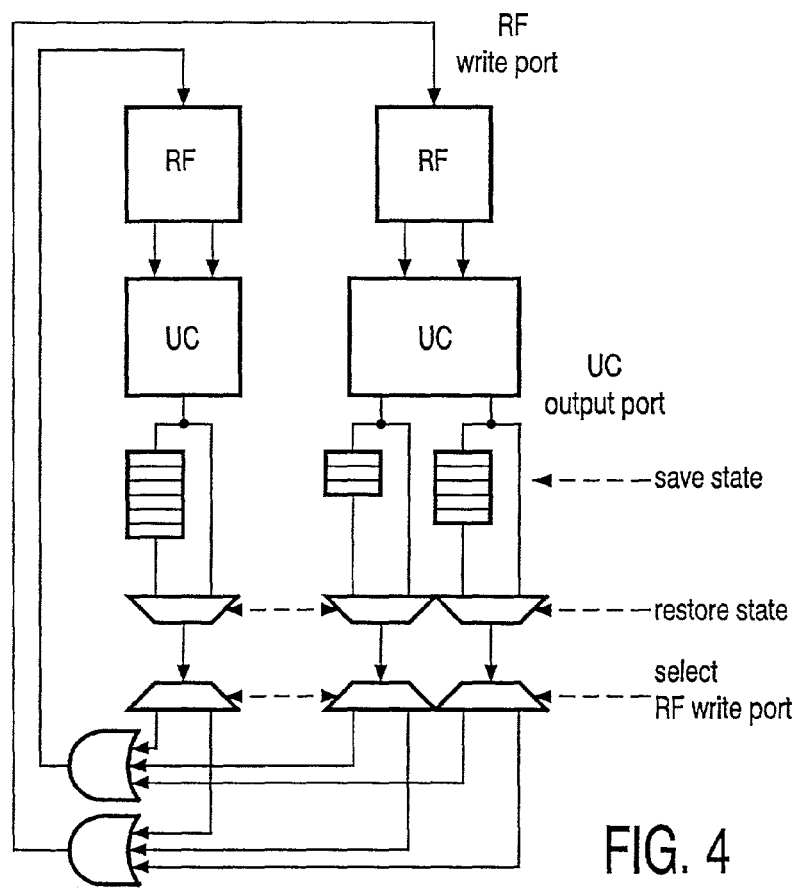
FIG. 4 is a schematic block diagram showing FIFO buffers at the outputs of functional unit clusters.

As shown in FIG. 4, FIFO buffers at the outputs of functional unit clusters UC can be used to take a snapshot of the internal state of pipelined functional units.

Scan chains may be shared with the scan chains that are required for testing.

For pipelined functional units snapshot buffering can be implemented without requiring a shadow flipflop for every flipflop in the unit, or without requiring that every flipflop is part of a scan chain. At the functional unit cluster output ports, FIFO buffers can be placed (cf. FIG. 4). The size of a FIFO buffer is equal to the maximum latency of the output port to which the buffer is attached. Upon the detection of an interrupt the saving of context is started. During this process, no new operations are started. However, operations that are in flight on pipelined functional units are completed, that is, the functional units on which these operations are being executed are flushed by filling their pipelines with NOP operations. During flushing of the functional unit pipelines, the data and register indexes appearing at the functional unit cluster output ports are written to the FIFO buffer instead of to a register file RF. The process ends when all FIFO buffers are full.

When an interrupt service routine ends, data and register indexes for the register files RF are obtained from the FIFO buffers, instead of from the functional unit output ports. The switch to normal operation in which data and register indexes are taken from an output port occurs when a FIFO buffer becomes empty.

Interrupt nesting provides an additional complexity to this approach. When nesting is allowed, it must be possible to save the contents of the FIFO buffers to a software stack. For this purpose the state stored in these FIFOs must be accessible. To this end, the FIFO buffers can be part of a group of scan chains that is addressable from a load/store unit, as described previously.

The advantage of using FIFO buffers for pipelined CIS functional units is that shadow flipflops are shared among different CIS functional units in a functional unit cluster. This can significantly reduce the number of shadow flipflops required. When the approach is used for pipelined non-CIS functional units, no scan-chains are needed inside these functional units. However, this comes at the expense of the extra shadow flipflops for the FIFO buffer, that would not have been needed if only scan chains were used.

An example of the actions required when the normal program flow is interrupted, assuming that the ISR is allowed to use all processor resources and can be interrupted by another interrupt (nesting):

Processor is executing normal program trace.
Hardware detects IRQ.
Hardware freeze non-CIS resources, globally disables interrupts, and copies state of CIS resources to shadow buffer.
Program control enters ISR.
ISR saves state of non-CIS to software stack.
ISR copies shadow buffer contents to software stack.
ISR saves required registers to software stack.
ISR globally re-enables interrupts to allow nesting.
ISR performs required actions, that is, it actually services the interrupt.
ISR globally disables interrupts.
ISR restores used registers from software stack.
ISR restores shadow buffer contents from software stack.
ISR freezes non-CIS resources.
ISR restores state on non-CIS resources from software stack.
Program control reaches end of ISR.

Hardware copies shadow buffer contents to state of CIS resources, thaws non-CIS resources, and globally re-enable interrupts.

Processor proceeds with normal program trace.

The invention claimed is:

1. Digital signal processing apparatus comprising a plurality of available hardware resource means and a first instruction set means having access to said available hardware resource means, so that at least a part of said hardware resource means execute operations under control of said first instruction set means;

the digital signal processing apparatus further comprising a second instruction set means having access to only a predetermined limited subset of said plurality of available hardware resource means, so that at least a part of said predetermined limited subset of said hardware resource means execute operations under control of said second instruction set means, wherein in case of an interrupt the state of all of said limited subset of hardware resource means are stored within a single clock cycle using a plurality of flip-flops and all hardware resource means under control of said first instruction set means have their state frozen; and wherein at least a part of such hardware resource means which are not directly accessible and not included in said predetermined limited subset of said hardware resource means are chained together in a first scan chain means and at least a part of such hardware resources which are not directly accessible and included in said predetermined limited subset of said hardware resource means are chained together in a second scan chain means.

2. Apparatus according to claim 1, wherein said available hardware resource means are processor resource means.

3. Apparatus according to claim 1, comprising first state buffer means for storing the current state of hardware resource means in case of an interrupt, wherein in case of an interrupt said first state buffer means stores the current state of at least a part of such hardware resource means which are not included in said predetermined limited subset of said hardware resource means.

4. Apparatus according to claim 3, further comprising second state buffer means for storing in case of an interrupt the current state of at least a part of said predetermined limited subset of said hard-ware resource means, said second state buffer means having a smaller size than that of said first state buffer means.

5. Apparatus according to claim 4, comprising means for supplying power to said second state buffer means, wherein said power supply means essentially supplies power to said second state buffer means only during interrupt handling.

6. Apparatus according to claim 1, wherein said second instruction set means does not allow operations in parallel.

7. Method for processing digital signals in a digital signal processing apparatus comprising a plurality of available hardware resource means wherein at least a part of said hardware resource means execute operations under control of a first instruction set;

wherein at least a part of a predetermined limited subset of said plurality of available hardware resource means execute operations under control of a second instruction set having access to only said predetermined limited subset of said hardware resource means, wherein in case of an interrupt the state of all of said limited subset of hardware resource means are stored within a single clock cycle using a plurality of flip-flops and all hardware resource means under control of said first instruction set means have their state frozen; and wherein at least a part of such hardware resource means which are not directly accessible and not included in said predetermined limited subset of said hardware resource means are chained together in a first scan chain means and at least a part of such hardware resources which are not directly accessible and included in said predetermined limited subset of said hardware resource means are chained together in a second scan chain means.

8. Method according to claim 7, wherein in case of an interrupt the current state of hardware resource means are stored in first state buffer means;

wherein in case of an interrupt the current state of at least a part of such hardware resource means which are not included in said predetermined limited subset of said hardware resource means are stored in said first state buffer means.

9. Method according to claim 8, wherein in case of an interrupt the current state of at least a part of said predetermined limited subset of said hardware resource means are stored in a second state buffer means having a smaller size than that of said first state buffer means.

10. Method according to claim 9, wherein power in essentially supplied to said second state buffer means only during interrupt handling.

11. Method according to claim 7, wherein said second instruction set does not allow operations in parallel.

* * * * *